US008407596B2

(12) United States Patent
Yu et al.

(10) Patent No.: US 8,407,596 B2
(45) Date of Patent: Mar. 26, 2013

(54) MEDIA TIMELINE INTERACTION

(75) Inventors: Sandy Yu, Sunnyvale, CA (US);
Barn-Wan Li, San Jose, CA (US);
Jeffrey Chao-Nan Chen, Mountain View, CA (US); Allen Pin-Shiu Huang, Mountain View, CA (US); Jason Xiaobo Zhao, San Jose, CA (US); Mark Pearson, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 511 days.

(21) Appl. No.: 12/427,919

(22) Filed: Apr. 22, 2009

(65) Prior Publication Data

US 2010/0275123 A1 Oct. 28, 2010

(51) Int. Cl.
*G06F 3/00* (2006.01)
*G06F 17/00* (2006.01)

(52) U.S. Cl. ........ 715/731; 715/202; 715/723; 715/724; 715/725; 715/730; 715/732

(58) Field of Classification Search ................ 715/731, 715/732, 723, 202, 765, 724, 726, 730, 725, 715/964
See application file for complete search history.

(56) References Cited

U.S. PATENT DOCUMENTS

| | | | | |
|---|---|---|---|---|
| 5,675,752 A | | 10/1997 | Scott et al. ................... 395/333 |
| 6,317,141 B1 * | | 11/2001 | Pavley et al. ................. 715/732 |
| 6,683,649 B1 * | | 1/2004 | Anderson ................. 348/333.05 |
| 6,738,075 B1 * | | 5/2004 | Torres et al. .................. 715/723 |
| 6,836,870 B2 * | | 12/2004 | Abrams ......................... 715/730 |
| 7,194,701 B2 * | | 3/2007 | Stavely et al. ................ 715/838 |
| 7,312,803 B2 * | | 12/2007 | Wilkins ........................ 345/629 |
| 7,703,036 B2 * | | 4/2010 | Satterfield et al. ............ 715/777 |
| 7,849,406 B2 * | | 12/2010 | Okada et al. ................... 715/723 |
| 7,886,290 B2 * | | 2/2011 | Dhanjal et al. ................. 717/170 |
| 7,890,867 B1 * | | 2/2011 | Margulis ....................... 715/723 |
| 7,895,531 B2 * | | 2/2011 | Radtke et al. ................. 715/810 |
| 2004/0001106 A1 * | | 1/2004 | Deutscher et al. ............ 345/838 |
| 2005/0091574 A1 * | | 4/2005 | Maaniitty et al. .......... 715/500.1 |
| 2006/0036945 A1 * | | 2/2006 | Radtke et al. ................. 715/708 |
| 2006/0036964 A1 * | | 2/2006 | Satterfield et al. ............ 715/777 |
| 2006/0171515 A1 | | 8/2006 | Hintermeister et al. |
| 2006/0184980 A1 * | | 8/2006 | Cole .............................. 725/88 |
| 2006/0236219 A1 | | 10/2006 | Grigorovitch et al. |
| 2006/0242550 A1 | | 10/2006 | Rahman et al. |
| 2006/0262122 A1 | | 11/2006 | Hoddie et al. ................. 345/473 |
| 2006/0288389 A1 | | 12/2006 | Deutscher et al. .............. 725/88 |
| 2007/0033515 A1 * | | 2/2007 | Sull et al. .................... 715/500.1 |

(Continued)

FOREIGN PATENT DOCUMENTS

WO WO2008070105 A2 6/2008

OTHER PUBLICATIONS

International Search Report and The Written Opinion of the International Searching Authority, or the Declaration dated Nov. 17, 2010 in PCT/US2010/031109 filed Apr. 14, 2010; 11 pages.
Using the Windows Media File Editor, Plattsburgh State, 101 Broad Street, Plattsburgh, NY 12901, Copyright © 1996-2007, http://www.plattsburgh.edu/technology/it/help/streamingmedia/mediafileeditor.php, 11 pages.

(Continued)

*Primary Examiner* — Tadeese Hailu
*Assistant Examiner* — Nicholas Ulrich
(74) *Attorney, Agent, or Firm* — Merchant & Gould P.C.

(57) ABSTRACT

Media timeline interaction may be provided. An electronic presentation may comprise a media object. A user may select the media object within a presentation application and use an on-object user interface in conjunction with the application's user interface to modify the media object. The user may also display the modified media object within the presentation application.

17 Claims, 6 Drawing Sheets

U.S. PATENT DOCUMENTS

| | | | |
|---|---|---|---|
| 2007/0174774 A1* | 7/2007 | Lerman et al. | 715/723 |
| 2007/0186166 A1* | 8/2007 | Anderson et al. | 715/730 |
| 2007/0240072 A1 | 10/2007 | Cunningham et al. | 715/764 |
| 2008/0195981 A1* | 8/2008 | Pulier et al. | 715/974 |
| 2008/0263433 A1 | 10/2008 | Eppolito et al. | |
| 2009/0113279 A1* | 4/2009 | Monro et al. | 715/202 |
| 2009/0119597 A1* | 5/2009 | Vaughan et al. | 715/732 |
| 2009/0144651 A1* | 6/2009 | Sprang et al. | 715/800 |

OTHER PUBLICATIONS

Heid, Jim, Digital Hub: Create Your Own Music Video, Macworld.com, Jul. 19, 2004, http://www.macworld.com/article/30948/2004/07/augustdigitalhub.html, 4 pages.

Team Digit, Digital Tools > Tips and Tricks, Mar. 1, 2007, htp://www.thinkdigit.com/details.php?article_id=374, 6 pages.

* cited by examiner

MEDIA TIMELINE INTERACTION

BACKGROUND

Media timeline interaction is a process for allowing a user to edit a multimedia presentation object within a presentation application. In some situations, multimedia objects are important additions to presentations. Traditionally, interacting with and editing a multimedia clip requires the use of advanced software and a user's understanding of concepts such as timelines and frames. A basic user would be unlikely to be able to achieve this scenario, and the conventional strategy for an advanced user would be to edit the clip outside of the presentation software.

SUMMARY

Media timeline interaction may be provided. This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Media timeline interaction may be provided. An electronic presentation may comprise a media object. A user may select the media object within a presentation application and use an on-object user interface in conjunction with the application's user interface to modify the media object. The user may also display the modified media object within the presentation application.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
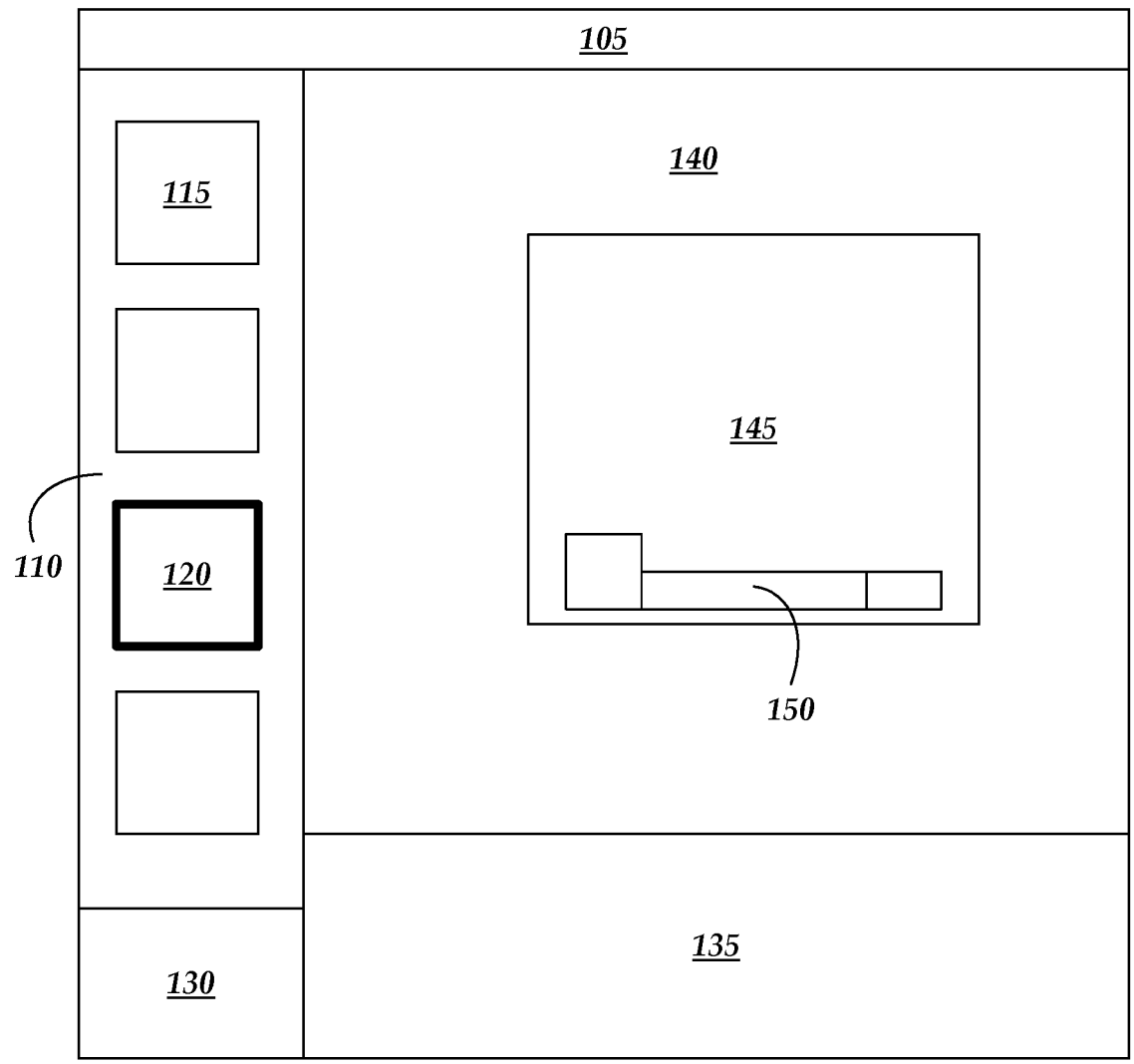
FIG. 1 is a block diagram of a presentation application.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Media timeline interaction may be provided. Consistent with embodiments of the present invention, a user interface (UI) may be embedded with a media object. The UI may comprise an edit mode and slideshow mode. A usage model may leverage interaction between an on-object UI timeline and a ribbon UI to achieve advanced user scenarios such as setting a poster frame and/or creating bookmarks. A selected point on the timeline may indicate a time and/or frame on which a command in the ribbon UI may be performed. A user may choose when a media plays and/or pauses or seek to a desired time. The on-object UI may give the user full control of the media during editing of a slide. For a selected media object, a user may play/pause/seek via the on-object UI and click on a ribbon UI command to achieve setting a poster frame and/or adding/deleting bookmarks. The timeline in the on-object UI may serves as a location/time chooser for the command.

FIG. 1 is a block diagram of a presentation application 100, such as PowerPoint® produced by Microsoft® Corporation of Redmond, Wash. Presentation application 100 may comprise an application menu bar 105, a slide preview area 110, an application command area 130, a ribbon user interface (UI) 135, and a slide display 140. Slide preview area 110 may comprise a plurality of slide preview images such as slide preview image 115 and selected slide preview image 120. Consistent with embodiments of the invention, slide display 140 may comprise a larger display of selected slide preview image 120. Slide display 140 may comprise a media object 145 embedded in the selected slide. An on-object user interface (OOUI) 150 may be displayed on media object 145.

Figure 2:
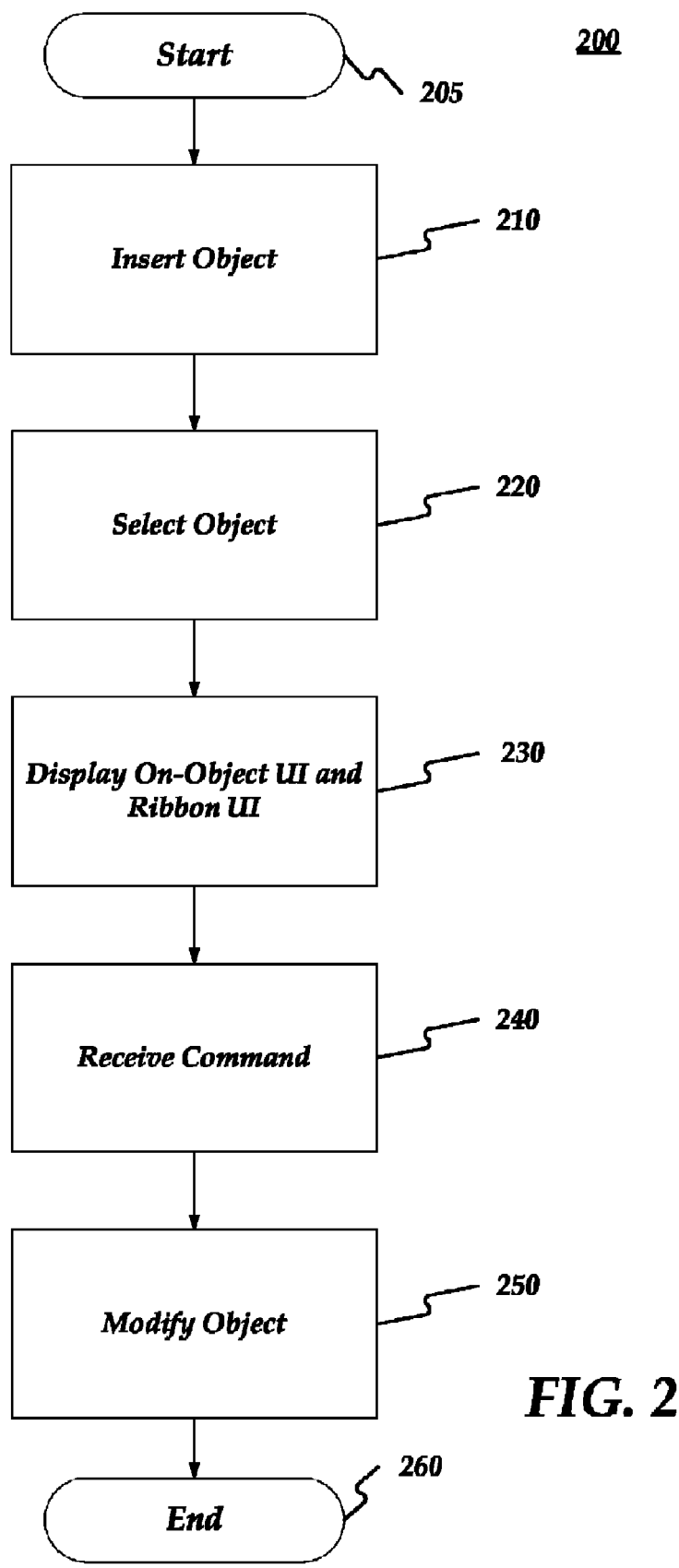
FIG. 2 is a flow chart of a method for providing media timeline interaction.

FIG. 2 is a flow chart setting forth the general stages involved in a method 200 consistent with an embodiment of the invention for providing media timeline interaction. Method 200 may be implemented using a computing device 600 as described in more detail below with respect to FIG. 6. Ways to implement the stages of method 200 will be described in greater detail below. Method 200 may begin at starting block 205 and proceed to stage 210 where computing device 600 may insert a media object. For example, a user may insert a video clip into a slide within presentation application 100.

From stage 210, where computing device 600 inserted the media object, method 200 may advance to stage 220 where computing device 600 may select the media object. For example, the user may select a slide comprising the media object from slide preview area 110. Presentation application 100 may display the selected slide in slide display 140 and the user may select the media object, such as media object 145.

Once computing device 600 selects the media object in stage 220, method 200 may continue to stage 230 where computing device 600 may display an on-object UI and a ribbon UI. For example, presentation application 100 may display OOUI 150 on media object 145 and a plurality of commands on ribbon UI 135. OOUI 150 and ribbon UI 135 are described with greater detail below with respect to FIGS. 3 and 5.

After computing device 600 displays the user interfaces in stage 230, method 200 may proceed to stage 240 where computing device 600 may receive a command to perform on the media object. For example, the user may use OOUI 150 to select all and/or a portion of media object 145, such as a five second subset of a 10 second video clip. For another example, the user may launch a dialog box (not shown) used to select all and/or a portion of media object 145. The user may then select a modification command to be performed on media object 145 from ribbon UI 135. For example, the user may desire to perform one of the following commands: remove the selected portion of the media object, removing an unselected portion of the media object, resize the media object, add a bookmark to the media object, modify a playback volume of the media object, and/or add an overlay to the media object. Consistent with embodiments of the invention, the user may also use OOUI 150 and/or ribbon UI 135 to control playback of media object 145.

From stage 240, where computing device 600 received the command, method 200 may advance to stage 250 where computing device 600 may modify the selected media object in accordance with the received edit command. For example, if the user selected the five second portion of the video clip and selected a command to remove the unselected portion, computing device 600 may remove the unselected portion of the video clip from the electronic presentation.

Once computing device 600 modifies media object 145 in stage 240, method 200 may then end at stage 250.

Consistent with embodiments of the invention, presentation application may comprise at least two operational modes—an editing mode and a slideshow mode. In editing mode, elements of an electronic presentation may be created, removed, and/or changed by a user. In slideshow mode, the electronic presentation may be displayed, for example, slide by slide. The user may switch between editing mode and slideshow mode using, for example, a user interface control located in application menu bar 105 and/or application command area 130. During slideshow mode, an electronic presentation may display each slide in sequence and media objects may be displayed, as modified, on their respective slides. For example, unselected portions of a video clip removed while in editing mode may be hidden from display while in slideshow mode.

Figure 3A:
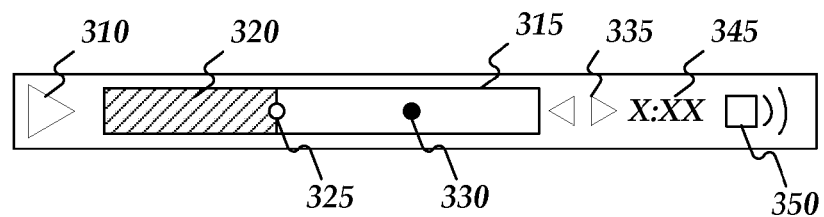
FIGS. 3A-3B are diagrams illustrating an on-object user interface.
Figure 3B:
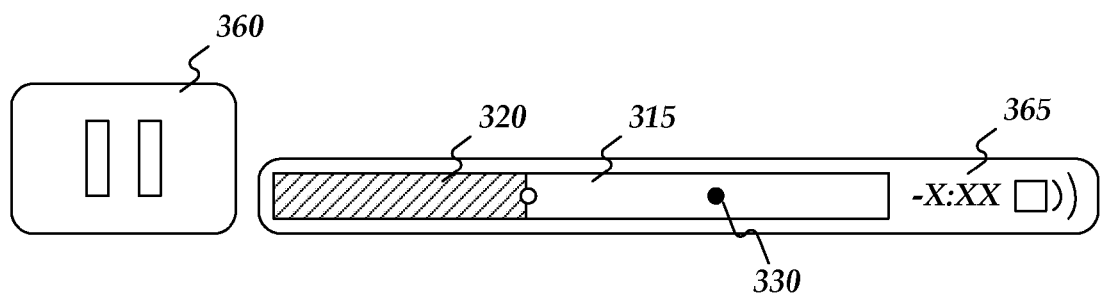

FIG. 3A is a diagram illustrating an editing mode OOUI 300. FIG. 3B is a diagram illustrating a slideshow mode OOUI 355. Editing mode OOUI 300 may comprise a playback button 310, a timeline 315, a contrail 320, a pill 325, a bookmark 330, a nudge control 335, a time indicator 345, and a volume control 350.

Consistent with embodiments of the invention, playback button 310 may display an icon that toggles between a play and pause icon depending on a current state of media object 145. Media object states are described with greater detail below with respect to FIG. 4. Time indicator 345 may numerically indicate a time point corresponding to a current time location and may update in response to a user's selection and dragging of pill 325 back and forth within timeline 315. Volume control 350 may operate as a mute/unmute button when selected and may display different icons for the muted/unmted states. When hovered over, a volume slider may be displayed above volume control 350.

Nudge control 335 may provide fine-grain control within media object 145. If media object 145 is playing when either nudge button associated with nudge control 145 is selected, media object 145 may pause and then advances or go back a predefined amount, such as one frame or a quarter of a second. Media object 145 may update the displayed frames according to the new time location.

Pill 325 may indicate a point of interest currently selected within media object 145. Contrail 320 may precede pill 325 to demarcate the time that's already been played. Bookmark 330 may denote a corresponding time points for which a bookmark has been added via ribbon UI 135. When bookmark 330 is selected, an "Add bookmark" command on ribbon UI 135 may be removed and/or disabled and a "remove bookmark" command may be added and/or enabled.

Editing mode OOUI 300 play controls may be optimized around providing fine-level control for adding, moving, and/or removing bookmarks or poster frame settings in addition to providing navigation and playback controls. The length of timeline 315 may be determined according to the width of the media object that is in view. For example, if part of a video is off-screen, that part of the video may not count as part of the media object that is in view. If the user has zoomed in to the media object, then anything not in view may not count in determining the width of the control. Consistent with embodiments of the invention, a minimum length for timeline 315 may comprise 121 px when a minimum length of editing mode OOUI 300 is 250 px. The total length of editing mode OOUI 300 may be 20 px less than the width of the media object that is currently in view. The width of editing mode OOUI 300 may update as the media object is resized.

While presentation application 100 is in the editing mode, editing mode OOUI 300 may appear when media object 145 is selected and a poster frame may be used for display until playback starts. Once media object 145 is de-selected, editing mode OOUI 300 may disappear. Consistent with embodiments of the invention, the poster frame may comprise the first frame of a video clip unless the user has selected an alternate frame for use as the poster frame. For example, a user may select a time position within media object 145 using timeline 315 wherein the selected time position comprises a still frame of a video clip. The user may then select a command on ribbon UI 135 to use the still frame at the selected time position as the poster frame for media object 145.

Further consistent with embodiments of the invention, the user may select a portion of media object 145 using timeline 315. For example, the user may select an initial time position on timeline 315 and OOUI 150 may display pill 325 at the selected initial time position. The user may then drag pill 325 to a second time position to select the portion of media object 145 between the initial time position and the second time position.

OOUI 150 may not appear if multiple objects are selected so that only one OOUI is visible at any time. While presentation application 100 is in the editing mode, if no OOUI controls are visible, then editing mode OOUI 300 may appear in response to a user hovering over media object 145. If multiple media object are hovered over at the same time, the controls for the top-most object may appear. The audio/video UI does not appear if the video object is undergoing animation and/or current playback. During resize and/or move of media object 145, OOUI 150 is not part of the outline that's being dragged. OOUI 150 may redraw in the correct location once the new position/size has been selected.

Slideshow mode OOUI 355 may comprise a separated and/or enlarged playback button 360 rather than playback button 310. Slideshow mode OOUI 355 may focus on the primary scenarios of playback and navigation while presenting and may be displayed with a degree of transparency, such as 30%, over media object 145. The width of slideshow mode OOUI 355 may vary as does the width of editing mode OOUI 300, described above. In slide show mode, the total length of slideshow mode OOUI 355 may be 10 px less than the width of the media object unless that value is less than a minimum length constraint (e.g. 250 px).

Consistent with embodiments of the invention, if media object 145 is less than or equal to 180 px mouse hover over any part of media object 145 may cause slideshow mode OOUI 355 to appear. If media object 145 is greater than 180 px in height, only the bottom $\frac{1}{3}^{rd}$ portion of the asset will cause the OOUI to appear. Slideshow mode OOUI 355 may also be reached by tab-selecting to media object 145. Further consistent with embodiments of the invention, slideshow mode OOUI 355 may fade in over a period of time, such as 0.25 seconds. Once slideshow mode OOUI 355 appears, hovering anywhere over the controls may cause slideshow mode OOUI 355 to continue to be visible, even if the mouse pointer is no longer over media object 145.

Volume changes made via volume control 350 in editing mode OOUI 300 may be saved so that future playbacks of media object 145 are made at the selected volume level while changes made via volume control 350 in slideshow mode OOUI 355 may be used only for the current playback.

Figure 4:
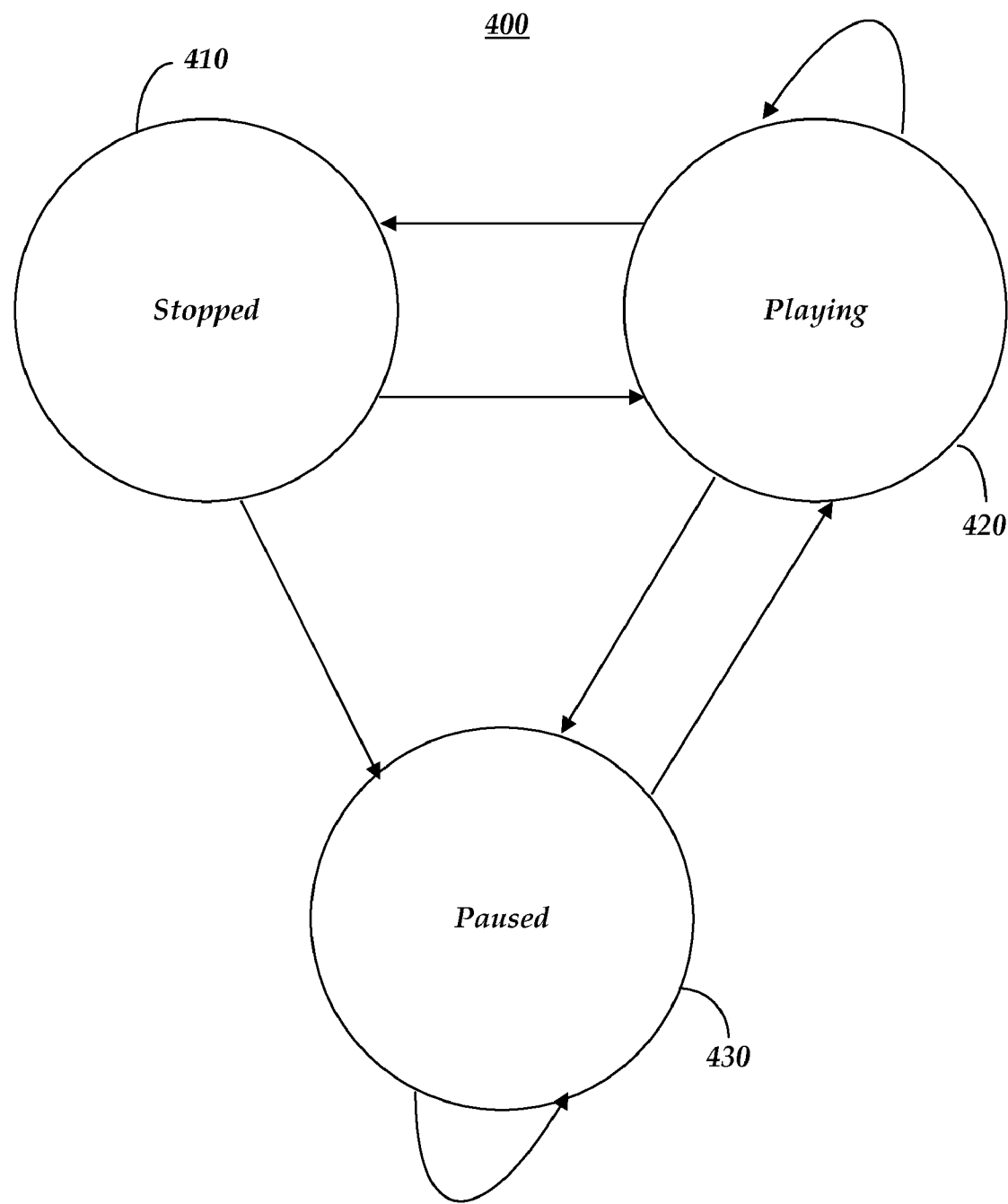
FIG. 4 is a diagram illustrating states of a media object.

FIG. 4 is a diagram illustrating playback states of media object 145. Available states may comprise a stopped state 410, a playing state 420, and a paused state 430. While in stopped state 410, media object 145 may display a poster frame. While in playing state 420, media object 145 may playback the audio, video, and/or animation associated with media object 145. While in paused state 430, media object 145 may display the most recently played frame.

The user may click anywhere on timeline 315 to move pill 325 to that location. If media object 145 was in stopped state 410, clicking on timeline 315 may changes media object 145 to paused state 430 at the location selected. If media object 145 was in playing state 420, clicking on timeline 315 may leave media object 145 in playing state 420 at the new time location. If media object 145 was in paused state 430, clicking on timeline 315 may leave media object 145 in paused state 430 at the new time location. If the mouse pointer is hovering over timeline 315 or pill 325, a "selector" mouse icon may be displayed. If the user is hovering over bookmark 330, the regular mouse icon may be displayed.

Consistent with embodiments of the invention, media object 145 may remain in its current state as long as the user stays on the slide containing media element 145, after deselection of media object 145, and/or when the user changes focus to another window/application.

Media object 145 may change to stopped state 410 when presentation application 100 switches between editing mode and slideshow mode, when the user selects a new slide, and/or when a user selects a stop control.

Media object 145 may enter playing state 420 when the user selects a play control, such as playback button 310. Media object 145 may enter playing state 420 when presentation application 100 is in slideshow mode and the user selects media object 145. If media object 145 enters playing state 420 from stopped state 410, media object 145 may begin playback from the first frame. If media object 145 enters playing state 420 from paused state 430, playback may resume from the most recently played frame.

Media object 145 may enter paused state 430 from stopped state 410 when the user drags pill 325 to a new location in timeline 315 and/or clicks a location in timeline 315. Media object 145 may enter paused state 430 from playing state 420 when the user selects a pause command and/or nudge control 335.

Figure 5A:
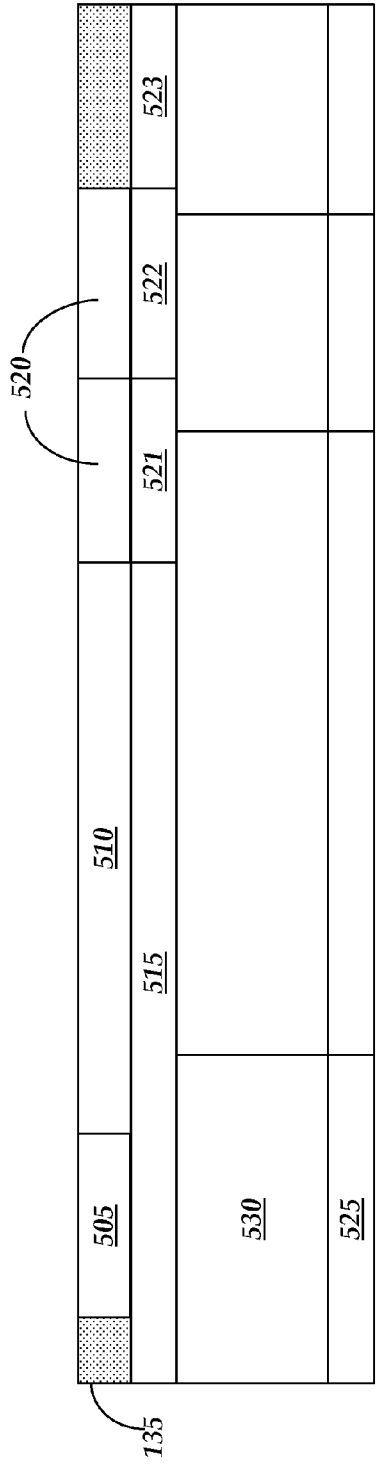
FIGS. 5A-5B are diagrams illustrating a user interface ribbon.

FIG. 5A is a block diagram of ribbon UI 135. Ribbon UI 135 may comprise a shortcut toolbar 505 comprising common user commands such as save, undo, and/or reload, a title bar 510, and an application menu 515. Ribbon UI 135 may further comprise a plurality of mode selectors 520 and a plurality of function selectors such as first function selector 521, second function selector 522, and third function selector 523. Consistent with embodiments of the invention, selection of each of plurality of mode selectors 520 may cause ribbon UI 135 to display a different plurality of associated function selectors. For example, plurality of mode selectors 520 may comprise a picture tools selector, an audio tools selector, and/or a video tools selector. Selection of the picture tools selector may cause user interface ribbon 500 to display a format function selector as first function selector 521 and an edit function selector as second function selector 522 while selection of the video tools selector may cause ribbon UI 135 to display a design function selector as first function selector 521 and an edit function selector as second function selector 522. Further consistent with embodiments of the invention, selection of media object 145 may cause ribbon UI 135 to activate a mode selector of plurality of mode selectors 520 associated with a type of media object 145. For example, selection of an audio object may cause ribbon UI 135 to activate the audio tools selector.

Ribbon UI 135 may further comprise a plurality of command sections, each comprising a command section title and a plurality of command options. For example, a first command section title 525 may comprise an "Adjust" command section and a first associated plurality of command options 530 may comprise command options such as "Brightness", "Contrast", "Recolor", "Compress", "Change", and "Reset".

Differing configurations of ribbon UI 135 may be displayed according to context. For example a video design configuration may be displayed when the user inserts a video, as in stage 210 of method 200 described above. The video design configuration may comprise command sections such as preview, poster frame, adjust, style, arrange, and size. Selection of each command option may cause presentation application 100 to provide feedback to the user. For example, ribbon UI 135 may display a success or error message to the user. When the user selects a different media object, ribbon UI 135 may be updated to display command sections associated with the type of the different media object.

Consistent with embodiments of the invention, OOUI 150 may also change to provide feedback to the user. For example, a bookmark icon such as bookmark 330 may be added to timeline 315 at the appropriate time location when a new bookmark is added. Further consistent with embodiments of the invention, ribbon UI 135 may only display command options that may be performed on a type associated with the selected media object. For example, ribbon UI 135 may display a brightness command option when the selected media object comprises a video clip or an image but not when the selected media object comprises an audio clip. Each command section may comprise a plurality of command options such as those listed in Table 1, below.

TABLE 1

| Command Section | Command Option |
| --- | --- |
| Design Tab | Design |
| Preview | Play |
| Preview | Pause |
| Poster Frame | Set Poster Frame |
| Poster Frame | Use Current Frame |
| Poster Frame | Image From File |
| Poster Frame | Reset |
| Adjust | Reset Design |
| Adjust | Brightness |
| Adjust | Contrast |
| Adjust | Recolor |
| Video Styles | N/A |
| Video Styles | Video Shape |

TABLE 1-continued

| Command Section | Command Option |
| --- | --- |
| Video Styles | Video Border |
| Video Styles | Video Effects |
| Arrange | Bring to Front |
| Arrange | Send to Back |
| Arrange | Selection Pane |
| Arrange | Align |
| Arrange | Group |
| Arrange | Rotate |
| Size | Crop |
| Size | Height |
| Size | Width |

Figure 5B:
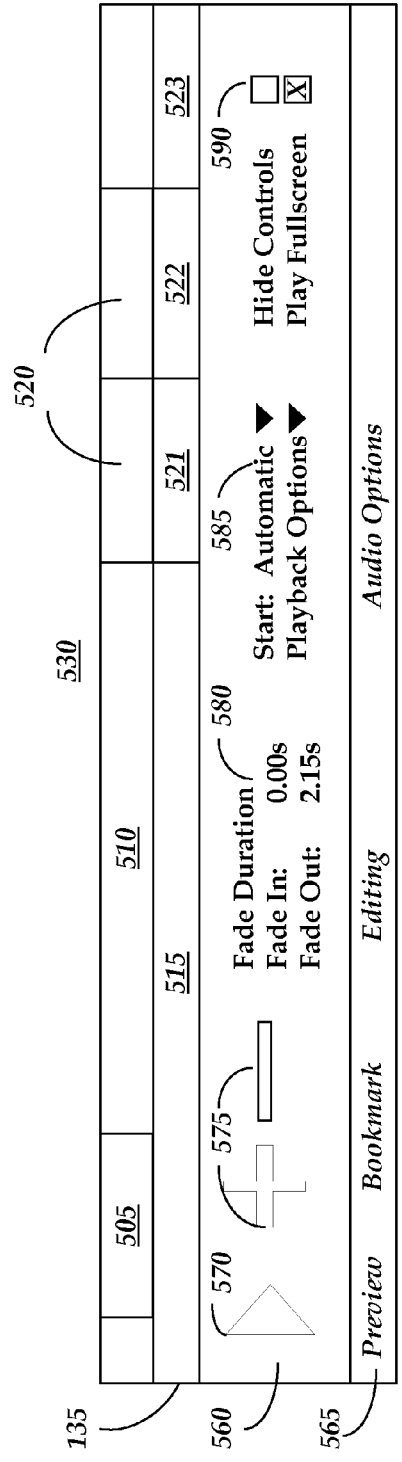

FIG. 5B is a block diagram illustrating an editing configuration 530 of ribbon UI 135. Editing configuration 530 may comprise a command option area 560 and a command title area 565. Command option area 560 may comprise a preview command selector 570, a bookmark command selector 575, an editing command selector 580, a dropdown option selector 585, and a checkbox command selector 590. For example, preview command selector may comprise a play/pause button operative to cause a selected portion of media object 145 to play while bookmark command selector 575 may comprise an add bookmark button and a remove bookmark button. Another command selector may be operative to add an overlay to the media object at a selected time location. For example, the user may add a text element overlay to the media element, such as dialog captioning.

An embodiment consistent with the invention may comprise a system for providing media interaction. The system may comprise a memory storage and a processing unit coupled to the memory storage. The processing unit may be operative to insert, select, and modify a media object. The media object may be modified through a first UI control displayed on the media object and/or a second UI control displayed elsewhere within a software application. Each UI control may comprise functionality associated with a type of the media object.

Another embodiment consistent with the invention may comprise a system for providing media timeline interaction. The system may comprise a memory storage and a processing unit coupled to the memory storage. The processing unit may be operative to display a UI control on a media object and receive a selection of a time location of the media object through the UI control. The processing unit may be further operative to display a second UI control associated with a type of the media object operative to receive a modification command to be performed on the selected time location.

Yet another embodiment consistent with the invention may comprise a system for editing a media object. The system may comprise a memory storage and a processing unit coupled to the memory storage. The processing unit may be operative to select the media object, display an object interface on the media object, receive a selection of at least a portion of the media object from the object interface, display a ribbon interface associated with a type of the media object, receive an edit command from the ribbon interface, modify the media object according to the received edit command, switch the presentation application to a slideshow mode, and display the modified media object.

Figure 6:
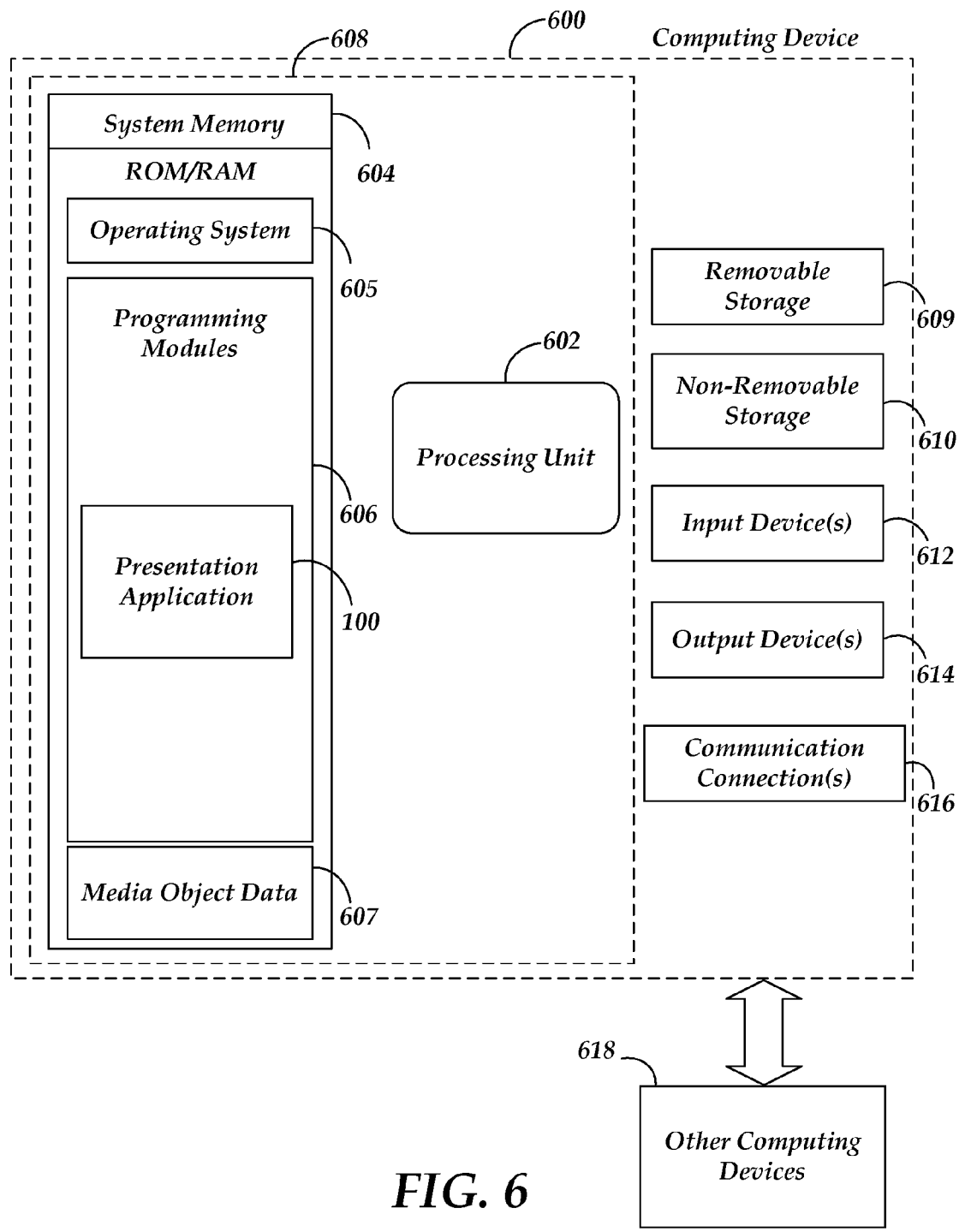
FIG. 6 is a block diagram of a system including a computing device.

FIG. 6 is a block diagram of a system including computing device 600. Consistent with an embodiment of the invention, the aforementioned memory storage and processing unit may be implemented in a computing device, such as computing device 600 of FIG. 6. Any suitable combination of hardware, software, or firmware may be used to implement the memory storage and processing unit. For example, the memory storage and processing unit may be implemented with computing device 600 or any of other computing devices 618, in combination with computing device 600. The aforementioned system, device, and processors are examples and other systems, devices, and processors may comprise the aforementioned memory storage and processing unit, consistent with embodiments of the invention. Furthermore, computing device 600 may comprise an operating environment for system 100 as described above. System 100 may operate in other environments and is not limited to computing device 600.

With reference to FIG. 6, a system consistent with an embodiment of the invention may include a computing device, such as computing device 600. In a basic configuration, computing device 600 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include operating system 605, one or more programming modules 606, and may include a plurality of media object data 607 such as image, audio, and video files. Operating system 605, for example, may be suitable for controlling computing device 600's operation. In one embodiment, programming modules 606 may include presentation application 100. Furthermore, embodiments of the invention may be practiced in conjunction with a graphics library, other operating systems, or any other application program and is not limited to any particular application or system. This basic configuration is illustrated in FIG. 6 by those components within a dashed line 608.

Computing device 600 may have additional features or functionality. For example, computing device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 600. Any such computer storage media may be part of device 600. Computing device 600 may also have input device(s) 612 such as a keyboard, a mouse, a pen, a sound input device, a touch input device, etc. Output device(s) 614 such as a display, speakers, a printer, etc. may also be included. The aforementioned devices are examples and others may be used.

Computing device 600 may also contain a communication connection 616 that may allow device 600 to communicate with other computing devices 618, such as over a network in a distributed computing environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 604, including operating system 605. While executing on processing unit 602, programming modules 606 (e.g. presentation application 100) may perform processes including, for example, one or more of method 200's stages as described above. The aforementioned process is an example, and processing unit 602 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing media interaction, the method comprising:
  inserting a media object into an electronic presentation;
  selecting the media object within the electronic presentation;

displaying at least one first user interface control on the media object;

displaying at least one second user interface control in a command area of the electronic presentation;

modifying the media object according to a command received by at least one of the following: the at least one first user interface control and the at least one second user interface control, wherein modifying the media object comprises:

determining whether the media object comprises a video clip, and in response to determining that the media object comprises the video clip:

receiving a selection of at least one frame of the video clip, converting the selected at least one frame of the video clip into an image, and displaying the converted at least one frame of the video clip as a poster frame on a slide within the electronic presentation comprising the video clip; and displaying the electronic presentation comprising the modified media object.

2. The method of claim 1, wherein the media object comprises a media type comprising at least one of the following: an image, an audio clip, and the video clip.

3. The method of claim 2, wherein the at least one first user interface control comprises a user interface control associated with the media type.

4. The method of claim 2, wherein the at least one second user interface control comprises a user interface control associated with the media type.

5. The method of claim 1, further comprising displaying at least one third user interface control on the media object during display of the electronic presentation.

6. The method of claim 1, wherein modifying the media object comprises:

receiving a selection command from the at least one first user interface control comprising a selection of a portion of the media object;

receiving a modification command from the at least one second user interface control comprising a modification to be made to the selected portion of the media object; and modifying the selected portion of the media object according to the received modification command.

7. The method of claim 6, further comprising hiding at least one unselected portion of the media object during display of the electronic presentation.

8. A computer-readable storage device which stores a set of instructions which when executed performs a method for providing media timeline interaction, the method executed by the set of instructions comprising:

displaying a first user interface control on a media object, wherein the first user interface control is operative to receive a selection of at least one time location of the media object, and wherein the first user interface control is operative to receive the selection of at least one time location of the media object comprises:

providing a timeline user interface control operative to allow selection of at least one frame of the media object, wherein the media object comprises a video clip;

displaying a second user interface control associated with a type of the media object, wherein the second user interface control is operative to receive a command to be performed on the selected portion of the media object;

and modifying the media object in accordance with the command received by the second user interface control, wherein modifying the media object comprises:

converting the selected at least one frame of the video clip into an image, and displaying the converted at least one frame of the video clip as a poster frame on a slide within an electronic presentation comprising the video clip.

9. The non-transitory computer readable medium of claim 8, wherein the media object is embedded in the electronic presentation.

10. The non-transitory computer readable medium of claim 9, further comprising:

switching the electronic presentation from an editing mode to a slideshow mode;

displaying the slide comprising the modified media object; and displaying a third user interface control on the modified media object operative to control display of the modified media object.

11. The non-transitory computer readable medium of claim 8, further comprising:

playing the video clip within the electronic presentation;

receiving a command to stop playback of the video clip within the electronic presentation; and redisplaying the converted at least one frame of the video clip as the poster frame on the slide.

12. The non-transitory computer readable medium of claim 8, wherein modifying the media object comprises at least one of the following: removing the selected portion of the media object, removing an unselected portion of the media object, resizing the media object, adding a bookmark to the media object, changing a playback volume of the media object, and adding an overlay to the media object.

13. The non-transitory computer readable medium of claim 12, wherein adding the overlay to the media object comprises adding at least one text element as the overlay to the media object.

14. The non-transitory computer readable medium of claim 8, further comprising hiding the first user interface control and the second user interface control when the media object is not selected.

15. The non-transitory computer readable medium of claim 8, further comprising displaying a feedback text associated with modifying the media object.

16. The non-transitory computer readable medium of claim 8, further comprising:

receiving a selection of a second media object comprising a different media type; and updating the second user interface control to display at least one command associated with the different media type of the second media object.

17. A system for editing a media object, the system comprising:

a memory storage; and a processing unit coupled to the memory storage, wherein the processing unit is operative to:

select the media object within a presentation application, display an object interface on the media object, receive a selection of at least a portion of the media object from the object interface, display a ribbon interface associated with a type of the media object, receive an edit command from the ribbon interface, wherein the ribbon interface is operative to display at least one edit option and wherein the at least one edit option comprises at least one of the following: remove the selected portion of the media object, removing an unselected portion of the media object, resize the media object, add a bookmark to the media object, modify a playback volume of the media object, and add an overlay to the media object, modify the media object according to the received edit command, wherein being operative to modify the media object comprises being operative to:

determine whether the media object comprises a video clip; and in response to determining that the media object comprises a video clip, convert the selected at least one portion of the video clip into an image, wherein the selected at least one portion of the video clip comprises at least one frame of the video clip, switch the presentation application to a slideshow mode, and display the modified media object, wherein being operative to display the modified media object comprises being operative to display the converted at least one frame of the video clip as a poster frame on a slide within the presentation application.

* * * * *